United States Patent
Scanlon et al.

(10) Patent No.: US 12,224,399 B2
(45) Date of Patent: Feb. 11, 2025

(54) ELECTRONIC CONNECTION IN AN ALL-SOLID STATE BATTERY AT THE ANODE/ELECTROLYTE INTERFACE

(71) Applicant: Government of the United States, as represented by the Secretary of the Air Force, Wright-Patterson AFB, OH (US)

(72) Inventors: Lawrence G. Scanlon, Fairborn, OH (US); William A. Feld, Beavercreek, OH (US); Jacob W. Lawson, Springfield, OH (US); Leah R. Lucente, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/539,745

(22) Filed: Dec. 14, 2023

(65) Prior Publication Data

US 2024/0136574 A1    Apr. 25, 2024

Related U.S. Application Data

(62) Division of application No. 17/524,794, filed on Nov. 12, 2021, now Pat. No. 11,894,514.

(60) Provisional application No. 63/126,179, filed on Dec. 16, 2020.

(51) Int. Cl.
*H01M 10/056* (2010.01)
*H01M 10/0562* (2010.01)
*H01M 10/058* (2010.01)

(52) U.S. Cl.
CPC ..... *H01M 10/0562* (2013.01); *H01M 10/058* (2013.01); *H01M 2220/30* (2013.01); *H01M 2300/0091* (2013.01)

(58) Field of Classification Search
CPC ......... H01M 10/0562; H01M 10/0561; H01M 10/056; H01M 10/058; H01M 10/052; H01M 2220/30; H01M 2300/0091
See application file for complete search history.

(56) References Cited

U.S. PATENT DOCUMENTS

| | | |
|---|---|---|
| 8,974,974 B1 | 3/2015 | Scanlon, Jr. et al. |
| 9,178,248 B2 | 11/2015 | Scanlon, Jr. et al. |
| 9,208,959 B2 | 12/2015 | Chiu et al. |
| 9,209,487 B2 | 12/2015 | Scanlon, Jr. et al. |
| 10,008,736 B2 | 6/2018 | Winoto et al. |
| 2009/0092903 A1 | 4/2009 | Johnson et al. |
| 2010/0086849 A1 | 4/2010 | Mizuno et al. |
| 2019/0051905 A1 | 2/2019 | Zhamu et al. |
| 2019/0386322 A1* | 12/2019 | Yawata ............. H01M 10/0525 |
| 2020/0303778 A1* | 9/2020 | Nogami ................ H01M 4/483 |
| 2021/0021009 A1* | 1/2021 | Li ....................... H01M 50/497 |
| 2021/0408577 A1 | 12/2021 | Kim et al. |
| 2022/0190383 A1 | 6/2022 | Scanlon et al. |

FOREIGN PATENT DOCUMENTS

WO    2000/063998 A1    10/2000

\* cited by examiner

*Primary Examiner* — Raymond Alejandro
(74) *Attorney, Agent, or Firm* — AFMCLO/JAZ; James F. McBride

(57) ABSTRACT

The present invention relates to a solid-state battery that is based on a phthalocyanine solid-state electrolyte/anode connection that is chemically obtained. Such chemical connection process yields a solid electrolyte interphase that connects the solid-state battery's phthalocyanine solid-state electrolyte and anode. Unlike other processes for forming solid-state electrolyte/anode connections, the present chemical process does not require that solid-state electrolyte be ductile and flow under high pressure.

6 Claims, No Drawings

ELECTRONIC CONNECTION IN AN ALL-SOLID STATE BATTERY AT THE ANODE/ELECTROLYTE INTERFACE

CROSS-REFERENCE TO RELATED APPLICATION

The present application claims priority to and is a divisional of U.S. application Ser. No. 17/524,794 filed Nov. 12, 2021, which in turn claims priority to U.S. Provisional Application Ser. No. 63/126,179 filed Dec. 16, 2020, the contents of both such priority applications being hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to an electronic connection in an all-solid state battery at the anode/electrolyte interface, a solid state battery comprising such connection and a process of making such connection and solid state battery.

BACKGROUND OF THE INVENTION

The application of a lithium metal anode to a solid-state electrolyte (SSE) does not necessarily result in good electrical contact whereby the resulting interfacial impedance between them is at a minimum. The high impedance at the anode/SSE interface can be associated with the formation of a solid electrolyte interphase (SEI) whose electrochemical characteristics are not compatible with fast Li-ion transport across the interface. This problem is particularly pronounced when phthalocyanine SSEs are used as unlike Thio-LISICON solid-state electrolytes phthalocyanine SSEs are not ductile and do not flow under high pressure.

Applicant recognized that the source of the problem associated with phthalocyanine SSEs is that they are semicrystalline materials. Applicant recognized the aforementioned problem with phthalocyanine SSE could be solved when a chemical additive is introduced in micro-liter quantities to the surface of a phthalocyanine SSE prior to the addition of the lithium metal anode, a SEI layer that has electrochemical characteristics suitable for fast Li-ion transport as well as being a good electronic insulator is obtained. In short, by employing such chemical approach to connecting electrode/electrolyte interfaces, a good electronic contact between the anode/SSE interface is obtained.

SUMMARY OF THE INVENTION

The present invention relates to a solid-state battery that is based on a phthalocyanine solid-state electrolyte/anode connection that is chemically obtained. Such chemical connection process yields a solid electrolyte interphase that connects the solid-state battery's phthalocyanine solid-state electrolyte and anode. Unlike other processes for forming solid-state electrolyte/anode connections, the present chemical process does not require that solid-state electrolyte be ductile and flow under high pressure.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Definitions

Unless specifically stated otherwise, as used herein, the terms "a", "the" mean "at least one".

As used herein, the terms "include", "includes" and "including" are meant to be non-limiting.

As used herein, the words "about," "approximately," or the like, when accompanying a numerical value, are to be construed as indicating a deviation as would be appreciated by one of ordinary skill in the art to operate satisfactorily for an intended purpose.

As used herein, the words "and/or" means, when referring to embodiments (for example an embodiment having elements A and/or B) that the embodiment may have element A alone, element B alone, or elements A and B taken together.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Solid-State Battery and Device Comprising Same

For purposes of this specification, headings are not considered paragraphs and thus this paragraph is paragraph fifteen of the present specification. The individual number of each paragraph above and below this paragraph can be determined by reference to this paragraph's number. In this paragraph fifteen, Applicants disclose a solid-state battery comprising a lithium metal anode or a lithium-indium alloy anode, a cathode comprising a surface and an interior region, said interior region comprising a phthalocyanine solid-state electrolyte and said surface comprising a layer of phthalocyanine solid-state electrolyte, and a solid electrolyte interphase, said solid electrolyte interphase connecting said phthalocyanine solid-state electrolyte and said lithium metal anode, said solid electrolyte interphase comprising lithium fluoride and an organic amorphous layer that are reaction products of lithium bis(fluorosulfonyl) imide in dimethoxyethane, and a mixture of 1,1,2,2-tetrafluoroethyl-2,2,3,3-tetrafluoropropyl ether and fluoroethylene carbonate, said solid-state battery having a discharge rate of from about seventeen hours, C/17, to about 2.83 hours, C/2.83, at 23° C.

with at least 97% capacity; or said solid-state battery having a discharge rate of from about 8.5 hours, C/8.5, at 0° C. with at least 80% capacity, or said solid-state battery having a discharge rate of from about three hours to about one hour, from about three hours to about two hours, or from about three hours to about two and one half hours at 23° C. with at least 97% capacity; or said solid-state battery having a discharge rate of from about three hours to about one hour, from about three hours to about two hours, or from about three hours to about two and one half hours at 0° C. with at least 80% capacity.

Applicants disclose the solid-state battery of paragraph fifteen wherein said anode comprises a lithium metal film having a thickness of from about 20 microns to about 149 microns or from about 50 microns to about 149 microns.

Applicants disclose the solid-state battery of paragraphs fifteen to sixteen wherein said anode has a surface area of from about 0.6 cm$^2$ to about 1000 cm$^2$ or from about 0.6 cm$^2$ to about 780 cm$^2$.

Applicants disclose the solid-state battery of paragraphs fifteen to seventeen wherein said phthalocyanine solid-state electrolyte comprises one mole of Tributyl(2-ethoxyethyl) ammonium Lithium Phthalocyanine and two moles of lithium bis(fluorosulfonyl) imide.

Applicants disclose a device comprising at least one battery according to paragraphs fifteen to eighteen, preferably said device is a computer, smart phone, or iPad, preferably said computer is a laptop computer.

Process of Making Solid-State Battery

For purposes of this specification, headings are not considered paragraphs and thus this paragraph is paragraph twenty of the present specification. The individual number of each paragraph above and below this paragraph can be determined by reference to this paragraph's number. In this paragraph twenty, Applicants disclose a process of making a solid state battery comprising connecting a cathode comprising a surface layer and an interior region, said interior region comprising a phthalocyanine solid-state electrolyte and said surface comprising a layer of phthalocyanine solid-state electrolyte; and an anode, said process comprising the steps of:

a) contacting said cathode's surface layer of phthalocyanine solid-state electrolyte with a mixture of lithium bis(fluorosulfonyl) imide, dimethoxyethane, 1,1,2,2-tetrafluoroethyl-2,2,3,3-tetrafluoropropyl ether and fluoroethylene carbonate, preferably said mixture of lithium bis(fluorosulfonyl) imide, dimethoxyethane, 1,1,2,2-tetrafluoroethyl-2,2,3,3-tetrafluoropropyl ether and fluoroethylene carbonate comprises two moles of lithium bis(fluorosulfonyl) imide in dimethoxyethane about 80% by volume, to which is added 1,1,2,2-tetrafluoroethyl-2,2,3,3-tetrafluoropropyl ether, about 20% by volume and about 1 wt. % fluoroethylene carbonate;

b) allowing said mixture of lithium bis(fluorosulfonyl) imide, dimethoxyethane, 1,1,2,2-tetrafluoroethyl-2,2,3,3-tetrafluoropropyl ether and fluoroethylene carbonate on said cathode's surface layer of phthalocyanine solid-state electrolyte to dry at about 20° C. to about 25° C. for a time of from about 15 minutes to about 25 minutes, preferably allowing said mixture of lithium bis(fluorosulfonyl) imide, dimethoxyethane, 1,1,2,2-tetrafluoroethyl-2,2,3,3-tetrafluoropropyl ether and fluoroethylene carbonate on said cathode's surface layer of phthalocyanine solid-state electrolyte to dry at about 22° C. to about 24° C. for a time of from about 18 minutes to about 22 minutes, more preferably allowing said mixture of lithium bis(fluorosulfonyl) imide, dimethoxyethane, 1,1,2,2-tetrafluoroethyl-2,2,3,3-tetrafluoropropyl ether and fluoroethylene carbonate on said cathode's surface layer of phthalocyanine solid-state electrolyte to dry at about 23° C. for a time of about 20 minutes;

c) contacting said cathode's surface layer of phthalocyanine solid-state electrolyte with a mixture of lithium bis(fluorosulfonyl) imide, dimethoxyethane, 1,1,2,2-tetrafluoroethyl-2,2,3,3-tetrafluoropropyl ether and fluoroethylene carbonate a second time; preferably said mixture of lithium bis(fluorosulfonyl) imide, dimethoxyethane, 1,1,2,2-tetrafluoroethyl-2,2,3,3-tetrafluoropropyl ether and fluoroethylene carbonate comprises two moles of lithium bis(fluorosulfonyl) imide in dimethoxyethane about 80% by volume, and 1,1,2,2-tetrafluoroethyl-2,2,3,3-tetrafluoropropyl ether, about 20% by volume and about 1 wt. % fluoroethylene carbonate;

d) contacting said cathode's surface layer of phthalocyanine solid-state electrolyte, said cathode's surface layer of phthalocyanine solid-state electrolyte comprising a coating comprising said mixture of lithium bis(fluorosulfonyl) imide, dimethoxyethane, 1,1,2,2-tetrafluoroethyl-2,2,3,3-tetrafluoropropyl ether and fluoroethylene carbonate, with said lithium metal anode to form a solid-state battery comprising a lithium metal anode, solid-state electrolyte, and lithiated iron phosphate cathode, said solid-state battery comprising a solid electrolyte interphase that connects said lithium anode and phthalocyanine solid-state electrolyte, said solid electrolyte interphase comprising lithium fluoride and an organic amorphous layer that are reaction products of said lithium bis(fluorosulfonyl) imide, dimethoxyethane, 1,1,2,2-tetrafluoroethyl-2,2,3,3-tetrafluoropropyl ether and fluoroethylene carbonate; preferably said cathode's surface layer of phthalocyanine solid-state electrolyte is contacted with said lithium metal anode within about one minute of the completion of Step c or said cathode's surface layer of phthalocyanine solid-state electrolyte is in contact with said lithium metal anode between one minute and twenty minutes of the completion of Step c, more preferably twenty minutes of the completion of Step c, preferably said contacting occurs at a temperature of about 20° C. to about 25° C., more preferably said contacting occurs at a temperature of about 22° C. to about 24° C.; and e) sealing said solid-state battery in a coin cell.

Electronic Connection Process

For purposes of this specification, headings are not considered paragraphs and thus this paragraph is paragraph twenty-one of the present specification. The individual number of each paragraph above and below this paragraph can be determined by reference to this paragraph's number. In this paragraph twenty-one, Applicants disclose a process of connecting a cathode comprising a surface and an interior region, said interior region comprising a phthalocyanine solid-state electrolyte and said surface comprising a layer of phthalocyanine solid-state electrolyte; and an anode, said process comprising the step of contacting said cathode's surface layer of phthalocyanine solid-state electrolyte with a mixture of lithium bis(fluorosulfonyl) imide, dimethoxyethane, 1,1,2,2-tetrafluoroethyl-2,2,3,3-tetrafluoropropyl ether and fluoroethylene carbonate, preferably said mixture of lithium bis(fluorosulfonyl) imide, dimethoxyethane, 1,1,2,2-tetrafluoroethyl-2,2,3,3-tetrafluoropropyl ether and fluoroethylene carbonate comprises two moles of lithium bis (fluorosulfonyl) imide in dimethoxyethane about 80% by volume, to which is added 1,1,2,2-tetrafluoroethyl-2,2,3,3-tetrafluoropropyl ether, about 20% by volume and about 1 wt. % fluoroethylene carbonate.

Applicants disclose the process of paragraph twenty-one further comprising:
  a) allowing said mixture of lithium bis(fluorosulfonyl) imide, dimethoxyethane, 1,1,2,2-tetrafluoroethyl-2,2,3,3-tetrafluoropropyl ether and fluoroethylene carbonate on said cathode's surface layer of phthalocyanine solid-state electrolyte to dry at about 20° C. to about 25° C. for a time of from about 15 minutes to about 25 minutes, preferably allowing said mixture of lithium bis(fluorosulfonyl) imide, dimethoxyethane, 1,1,2,2-tetrafluoroethyl-2,2,3,3-tetrafluoropropyl ether and fluoroethylene carbonate on said cathode's surface layer of phthalocyanine solid-state electrolyte to dry at about 22° C. to about 24° C. for a time of from about 18 minutes to about 22 minutes, more preferably allowing said mixture of lithium bis(fluorosulfonyl) imide, dimethoxyethane, 1,1,2,2-tetrafluoroethyl-2,2,3,3-tetrafluoropropyl ether and fluoroethylene carbonate on said cathode's surface layer of phthalocyanine solid-state electrolyte to dry at about 23° C. for a time of about 20 minutes;
  b) contacting said cathode's surface layer of phthalocyanine solid-state electrolyte with a mixture of lithium bis(fluorosulfonyl) imide, dimethoxyethane, 1,1,2,2-tetrafluoroethyl-2,2,3,3-tetrafluoropropyl ether and fluoroethylene carbonate a second time; preferably said mixture of lithium bis(fluorosulfonyl) imide, dimethoxyethane, 1,1,2,2-tetrafluoroethyl-2,2,3,3-tetrafluoropropyl ether and fluoroethylene carbonate comprises two moles of lithium bis(fluorosulfonyl) imide in dimethoxyethane about 80% by volume, and 1,1,2,2-tetrafluoroethyl-2,2,3,3-tetrafluoropropyl ether, about 20% by volume and about 1 wt. % fluoroethylene carbonate; and
  c) contacting said cathode's surface layer of phthalocyanine solid-state electrolyte, said cathode's surface layer of phthalocyanine solid-state electrolyte comprising a coating comprising said mixture of lithium bis(fluorosulfonyl) imide, dimethoxyethane, 1,1,2,2-tetrafluoroethyl-2,2,3,3-tetrafluoropropyl ether and fluoroethylene carbonate, with said lithium metal anode to form a solid-state battery comprising a lithium metal anode, solid-state electrolyte, and lithiated iron phosphate cathode, said solid-state battery comprising a solid electrolyte interphase that connects said lithium anode and phthalocyanine solid-state electrolyte, said solid electrolyte interphase comprising lithium fluoride and an organic amorphous layer that are reaction products of said lithium bis(fluorosulfonyl) imide, dimethoxyethane, 1,1,2,2-tetrafluoroethyl-2,2,3,3-tetrafluoropropyl ether and fluoroethylene carbonate; preferably said cathode's surface layer of phthalocyanine solid-state electrolyte is contacted with said lithium metal anode within about one minute of the completion of Step c or said cathode's surface layer of phthalocyanine solid-state electrolyte is in contact with said lithium metal anode between one minute and twenty minutes of the completion of Step c, more preferably twenty minutes of the completion of Step c, preferably said contacting occurs at a temperature of about 20° C. to about 25° C., more preferably said contacting occurs at a temperature of about 22° C. to about 24° C.

The raw materials used to practice the processes described in the present specification and to make the solid state battery described in the present specification can be obtained as follows: FEC Lithium; MTI Corporation; Sigma-Aldrich Corp; TCI America and Arkema Inc.

Test Methods

Solid-state Battery Discharge Rate Test: The solid-state battery should be tested for discharge and capacity as follows:

Equipment: The equipment needed to conduct this test is as follow: Princeton Applied Research, PARSTAT MC/PMC 1000, Potentiostat/Galvanistat; Tenney Environmental Chamber; Keithley 175 Auto Ranging Multimeter. Such equipment can be obtained from Princeton Applied Research 801 South Illinois Avenue, Oak Ridge, TN, 37831-0895 USA; Tenney Environmental 2821 Old Route 15, New Columbia, PA 17856 and Tektronix (Regional Headquarters) 14150 SW Karl Braun Dr., Beaverton, OR 97077.

Test Conditions: The test conditions used in cycling a cell are designed when using a lithiated iron phosphate cathode with a capacity of ~127 mAh/g based on the active weight of the cathode. This corresponds to 3.1 coulombs of charge where the active weight of the cathode is 6.76 mg when used with a cathode area of 0.636 $cm^2$.

When testing at 23° C.: The solid-state battery of interest is equilibrated in Tenney Environmental Chamber at 23° C. for 18 hours. Next, the solid-state battery is charged by applying a constant current of 150 micro-amps (236 micro-amps/$cm^2$) for 20,440 seconds (C/5.7 rate at 23° C.) followed by a constant potential charge at 3.6 V for 125,000 seconds. Then the solid-state battery is discharged at 300 micro-amps (471.7 micro-amps/$cm^2$) corresponding to a C/2.87 rate. The aforementioned PARSTAT instrument is used to achieve such charging and discharging.

When testing at 0° C.: The solid-state battery of interest is equilibrated in Tenney Environmental Chamber at 0° C. for 18 hours. Next the solid-state battery's impedance is determined using a PARSTAT instrument to establish a baseline resistance. Next, the solid-state battery is charged by applying a constant current of 100 micro-amps (157 micro-amps/$cm^2$) for 31,000 seconds (C/8.6 rate at 0° C.) followed by a constant potential charge at 3.6 V for 125,000 seconds. Then the solid-state battery is discharged at 100 micro-amps (157 micro-amps/$cm^2$) corresponding to a C/8.6 rate. The aforementioned PARSTAT instrument is used to achieve such charging and discharging.

When testing at 50° C.: The purpose of the solid-state battery tested at 50° C. was to investigate solid-state battery stability during long term cycling. The solid-state battery of interest is equilibrated in Tenney Environmental Chamber at 50° C. for 18 hours. Next the solid-state battery's impedance is determined using a PARSTAT instrument to establish a baseline resistance. Next the solid-state battery is charged by applying a constant current of 500 micro-amps (786 micro-amps/$cm^2$) for 4,010 seconds (C/1.11 rate at 50° C.). Then the solid-state battery is discharged at 500 micro-amps (786 micro-amps/$cm^2$) for 4,010 seconds (C/1.11 rate at 50° C.). Then the solid-state battery is discharged at 50 micro-amps (78.6 micro-amps/$cm^2$) for 62,000 seconds corresponding to a C/17.2 rate at 50° C. The aforementioned PARSTAT instrument is used to achieve such charging and discharging.

Testing is conducted as follows: Once the cell is assembled as a coin cell (solid-state battery), the aforementioned Multimeter is used to measure cell voltage and cell resistance. The response when measuring cell resistance should be an over load condition (OL) signifying no electronic conduction or implying no electronic short within the cell. After the Multimeter test, an impedance spectrum is run followed by charging/discharging according to the conditions described above. Four charge/discharge cycles are run followed by another impedance spectrum to check to see if there is any change in impedance. If the capacity over such four cycles drops by no more than 20%, the subject solid-state battery passes the test at the temperature tested.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1 of Aerosol Jet Deposition Process of Making a Solid-state Battery: Aerosol jet deposition (OPTOMEC AJ 300 series printer with 1 cm print head) was used to deposit the solid-state electrolyte onto the commercially purchased lithiated iron phosphate cathode from MTI Corporation. A template was used to control the area of deposition onto the substrate of the 80 micron thick lithiated iron phosphate cathode. The area of the template was 1.25 inches by 2.0 inches. The area for deposition is controlled by the amount of solid-state electrolyte used in the process. If the area covered was 7.7 inches by 7.7 inches then one could fabricate a cell with a capacity of 0.5 Ah. An area of 11 inches by 11 inches would result in the fabrication of a 1.0 Ah cell. The area covered by the 1.25 inches by 2.0 inches would represent a capacity of ~21 mAh.

The solid-state electrolyte is composed of one mole of Tributyl (2-ethoxyethyl) ammonium Lithium Phthalocyanine and two moles of lithium bis(fluorosulfonyl) imide (LiFSI) 90 weight percent and 10 weight percent polyvinyl difluoride (PVDF) flex binder. The solid-state electrolyte is then dissolved in dimethylacetamide (DMA) to form the ink used in the aerosol jet deposition process. The aerosol jet deposition process and ink formulation are conducted in a dry room. The computer controlled aerosol process is conducted over a period of 3 days in order to print thin layers that first penetrate into the cathode and then subsequently build up a layer of electrolyte above the cathode. In addition, during the deposition process, the platen upon which the substrate is placed is heated from 23° C. to 50° C. in order to make sure that the layer just deposited is somewhat dry prior to the addition of another layer. The thickness of the electrolyte layer above the cathode is typically about 20 microns or less. Once the deposition is complete, the solid-state electrolyte/cathode is then dried under vacuum for 18 hours while at 100° C. followed by drying at 130° C. for ten minutes. Upon completion of drying for ten minutes at 130° C., the SSE/Cathode is then allowed to cool to 23° C. while under vacuum. The drying is also conducted in a dry room with a relative humidity at 70° F. of 0.000559%.

The chemical additive used in the lithium metal cell that was discharged at the high rate of C/2.85 at 23° C. is composed of a mixture of 2 moles of lithium bis(fluorosulfonyl) imide in dimethoxyethane (DME), 80% by volume, and 1,1,2,2-tetrafluoroethyl-2,2,3,3-tetrafluoropropyl ether, 20% by volume. In addition, 1 wt. % fluoroethylene carbonate (FEC) was added to the 80:20 mixture. By way of example a non-limiting example, the skilled artisan will appreciate that the aforementioned 80%, 20% and 1% values may be varied, in one aspect from 76% to 84%, from 28% to 22% and 0.8% to 1.2% respectively. The additive was used in micro-liter quantities, less than 10 micro-liters, to completely cover the surface of the solid-state electrolyte. The addition of additive was made from a 500 micro-liter syringe which was filled to the 10 micro-liter level. Five drops of solution covered the entire area of the solid-state electrolyte, 1.27 $cm^2$, used in the construction of a coin cell. There was still solution left in the syringe. Once the 5 drops were added, there was a 20 minute delay prior to the addition of 3 more drops of additive. After the 3 drop addition, a lithium metal anode, 149 micro-meters thick with an area of 0.636 $cm^2$, was placed onto the solid-state electrolyte and then this entire assembly of lithium metal anode, chemical additive, solid-state electrolyte, and cathode was sealed in a coin cell for electrochemical characterization. The entire fabrication process including the addition of lithium metal added to the solid-state electrolyte surface was conducted entirely in a dry room.

Once the cell was assembled, a multimeter test showed that the open circuit voltage was 3.01 V and that the cell showed an overload, which is consistent with no electronic conduction. The cell voltage upon equilibrating overnight at 23° C. was 3.11 V.

Example 2 Solid-state Battery and Solid-state Battery Performance: A solid-state battery comprising a lithium metal anode, a solid electrolyte interphase, a phthalocyanine solid-state electrolyte and a lithiated iron phosphate cathode was made using the process of Example 1. The solid-state battery was cycled five times using a constant current charge of 150 micro-amps (235.8 micro-amps/$cm^2$), C/5.7 rate at 23° C., followed by a constant potential charge at 3.6 V for 125,000 seconds at 23° C. The discharge was run using a constant current of 300 micro-amps (471.7 micro-amps/$cm^2$), C/2.87, at 23° C. The average capacity for the five cycles was ~126 mAh/g which is representative of a coulombic efficiency of ~97%. The cycling of the solid-state battery ended in a discharge. Then we equilibrated the solid-state battery at 0° C. for 18 hours before we started a constant current charge at a C/8.6 hour rate at 0° C. for 31,000 seconds followed by a constant potential charge at 3.6 V for 125,000 seconds at 0° C. The solid-state battery was then discharged using a constant current of 100 micro-amps (157 micro-amps/$cm^2$), C/8.6, at 0° C. The average capacity for the five cycles was ~101 mAh/g equating to a coulombic efficiency of ~80%. The discharge plateau for all five discharges were at 3.17 V.

Example 3 Solid-state Battery and Solid-state Battery Performance: A solid-state battery comprising a lithium metal anode, a solid electrolyte interphase, a phthalocyanine solid-state electrolyte and a lithiated iron phosphate cathode was made using the process of Example 1. In this particular example, we cycled the cell at 50° C. and using a constant current of 500 micro-amps (786 micro-amps/$cm^2$), C/1.23 rate, for 4,440 seconds for both the charge and discharge. The average capacity for the five cycles was 171 mAh/g. the average discharge voltage was 3.36 V. upon completion of the five cycles, the total number of cycles that this cell had undergone was 100 cycles.

Two solid-state batteries were fabricated using either a lithium metal anode or a lithium-indium alloy as the anode and a lithiated iron phosphate cathode where the loading of the active weight for the cathode was 14.9 mg/$cm^2$. The cells were charged using a constant current of 50 micro-amps corresponding to 55 hours and 33 minutes for charge. The discharge was run using a constant current of 100 micro-amps corresponding to 27 hours and 47 minutes, C/27.7 rate. Charging/discharging was done at 23° C. The capacity for the initial discharge was 291 mAh/g for the cell with the lithium metal anode and where the discharge plateau was at 3.38 V. This result corresponds to an energy density of 457 Wh/kg based on the weight of the anode, solid-state electrolyte, and the cathode. The initial capacity for the cell fabricated with the lithium-indium alloy as the anode was 287 mAh/g. The discharge plateau for this cell was at 2.76 V corresponding to an energy density of 105 Wh/kg based on the total weight of the anode, solid-state electrolyte, and cathode.

Every document cited herein, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A solid-state battery comprising a lithium metal anode or a lithium-indium alloy anode, a cathode comprising a surface and an interior region, said interior region comprising a phthalocyanine solid-state electrolyte and said surface comprising a layer of phthalocyanine solid-state electrolyte, and a solid electrolyte interphase, said solid electrolyte interphase connecting said phthalocyanine solid-state electrolyte and said lithium metal anode, said solid electrolyte interphase comprising lithium fluoride and an organic amorphous layer that are reaction products of lithium bis(fluorosulfonyl) imide in dimethoxyethane, and a mixture of 1,1,2,2-tetrafluoroethyl-2,2,3,3-tetrafluoropropyl ether and fluoroethylene carbonate, said solid-state battery having a discharge rate of:
   a) from about seventeen hours, C/17, to about 2.83 hours, C/2.83, at 23° C. with at least 97% capacity;
   b) from about 8.5 hours, C/8.5, at 0° C. with at least 80% capacity;
   c) from about three hours to about one hour at 23° C. with at least 97% capacity; or
   d) from about three hours to about one hour at 0° C. with at least 80% capacity.

2. The solid-state battery of claim 1 wherein said anode comprises a lithium metal film having a thickness of from about 20 microns to about 149 microns or from about 50 microns to about 149 microns.

3. The solid-state battery of claim 1 wherein said anode has a surface area of from about 0.6 cm$^2$ to about 1000 cm$^2$ or from about 0.6 cm$^2$ to about 780 cm$^2$.

4. The solid-state battery of claim 1 wherein said phthalocyanine solid-state electrolyte comprises one mole of Tributyl(2-ethoxyethyl)ammonium Lithium Phthalocyanine and two moles of lithium bis(fluorosulfonyl) imide.

5. A device comprising at least one battery according to claim 1.

6. The device of claim 5, said device being a computer, smart phone, or iPad.

* * * * *